United States Patent [19]
Lobel

[11] 3,821,454
[45] June 28, 1974

[54] METHOD OF AGEING MEAT
[75] Inventor: Stanley Lobel, Yonkers, N.Y.
[73] Assignee: Leon Label, New Hyde Park, N.Y.; a part interest
[22] Filed: Dec. 15, 1971
[21] Appl. No.: 208,164

[52] U.S. Cl.............................. 426/524, 99/194
[51] Int. Cl............................................. A22c 18/00
[58] Field of Search............................... 99/107, 194

[56] References Cited
UNITED STATES PATENTS
2,169,081   8/1939   James ................................... 99/107
2,489,918   11/1949  Menges ................................. 99/107
2,560,057   7/1951   Williams ........................... 99/194 X Primary Examiner—Hyman Lord
Attorney, Agent, or Firm—Charles E. Temko

[57] ABSTRACT

Meat to be aged is subjected to a flow of air at a temperature of just above freezing to 40° Fahrenheit. In a modification the moisture content of the air is lowered below that of the surrounding air. The means for utilizing the method comprise means to support the meat in a housing which directs the flow of air, and means to force the flow of air about the meat.

1 Claim, 2 Drawing Figures

PATENTED JUN 28 1974 3,821,454

METHOD OF AGEING MEAT

This invention relates generally to the ageing of meat, and more particularly to improvements thereof.

It is well known that the ageing of meats has the effect of causing the meat to become more tender and to improve the flavor thereof. The meat is hung, usually as a carcass, in a refrigerated atmosphere for weeks. This protracted procedure results in considerable loss of weight. Since the ageing is normally done on the most expensive cuts of meat, the economic loss is all the greater. Furthermore the ageing ties up inventory and capital and requires considerable space.

I have discovered that meat may be rapidly aged by subjecting the same to a rapidly moving flow of air so that I obtain a degree of ageing in from 24 to 72 hours that now requires several weeks.

It is therefore among the objects of the present invention to provide novel and highly useful methods of ageing meat in a short period of time.

Another object herein lies in the provision of novel apparatus for performing my methods which takes the form of simple appliances which may be used by unskilled persons, and which are relatively low in cost so that they may have a consequent wide distribution and use.

These objects and other incidental ends and advantages will more fully appear in the progress of this disclosure and be pointed out in the appended claims.

In accordance with the invention, my novel method of ageing meat comprises the steps of providing a flow of air about said meat, with the meat right in the stream of air so that it may intimately contact the surface of the meat; maintaining the temperature of said air flow between just above freezing and 40° Fahrenheit; and exposing the meat to the flow of air for a period of substantially 12 to 72 hours.

In a modification of the foregoing method the air flow has its moisture content reduced before it touches the meat, or arrives in proximity thereto.

Figure 1:
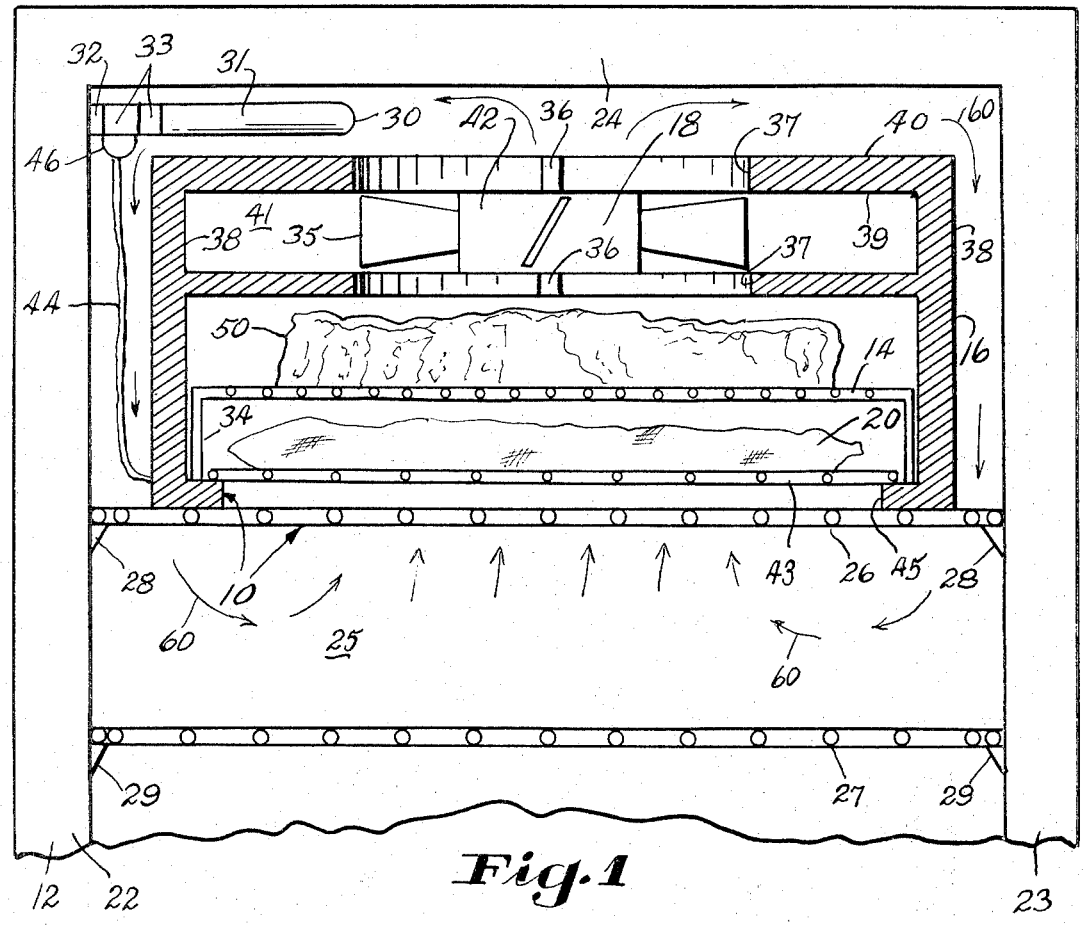
FIG. 1 is a fragmentary front elevational view, partly in section, showing an embodiment of the invention.

Turning to FIG. 1, the combination ageing apparatus generally indicated by reference character 10 comprises generally a means 12 for supplying refrigerated air; a meat supporting element 14; a casing or housing 16; air moving means 18; and air drying means 20.

The means 12 may be a well known electric (or ice cooled), or similar refrigerator. As shown a front door (not shown) has been opened to disclose the interior. Seen are side walls 22 and 23, top wall 24, rear wall 25, shelves 26 and 27, shelf supports 28 and 29. The refrigerator may be normal and usual in all respects, the refrigerating mechanism per se not being shown. The refrigerator may have an interior source of illumination on 30, including an incandescent bulb 31 and a socket 32. An adapter 33 enables the unit 40 to tap off electric energy for the fan 42. In the absence of an interior light in the refrigerator the cord 44 may be brought out through the space between the refrigerator door and the cabinet (pressed by the door gasket, not shown) to a suitable electrical outlet.

The meat supporting element 14 is in the form of a wire grid or similar foraminous material so that it will properly support the meat 50 in a substantially unobstructed manner in the path of the air flow 60 to provide maximum exposure of the meat to the air current. The element 14 may be suitably positioned by the legs 34.

The casing or housing 16 is preferably of rectangular shape, with sidewalls 38, top wall 39, and rear wall 41. Housing 16 has an open bottom so that the air flow has an unimpeded entrance. Housing 16 preferably has a front wall and door (not shown in FIG. 1) but like that shown in FIG. 2.

Disposed above the meat 50 is the means 18 which is shown in the form of an electrically driven fan 35 which is carried by struts 36 extending from the borders of the aligned orifices 37 in top and intermediate horizontal walls of housing 16. The motor of fan 35 is connected to the card 44 by circuitry not shown.

The air drying means 20 is preferably in the form of a porous bag containing silica gel or similar moisture absorbing substances. The bag is supported on a rack 43 carried by inwardly directed ledges 45 projecting from the opposed inner surfaces of walls 38. When the silica gel becomes saturated with moisture, it may be replaced, or well out in a wel known manner, and replaced.

In use, meat 50 is placed on supporting element 14, the means 20 is placed on rack 43, the refrigeration and hence air flow 60 is maintained at a temperature just above freezing and up to 40° Fahrenheit, and the electric current connected to the fan 35. The dehydrated air flow is forced and is preferable maintained at a relative humidity as low as practicable, preferably ranging between zero percent and 50 percent. The lower the humidity the quicker a skin-like layer is formed on the surface of the meat 50. This dry skin retards loss of moisture from the body of the meat, but it also prevents the formation of mold on the surface of the meat. The ageing process is continued until the meat is properly aged, for a period ranging between 24 and 72 hours.

Figure 2:
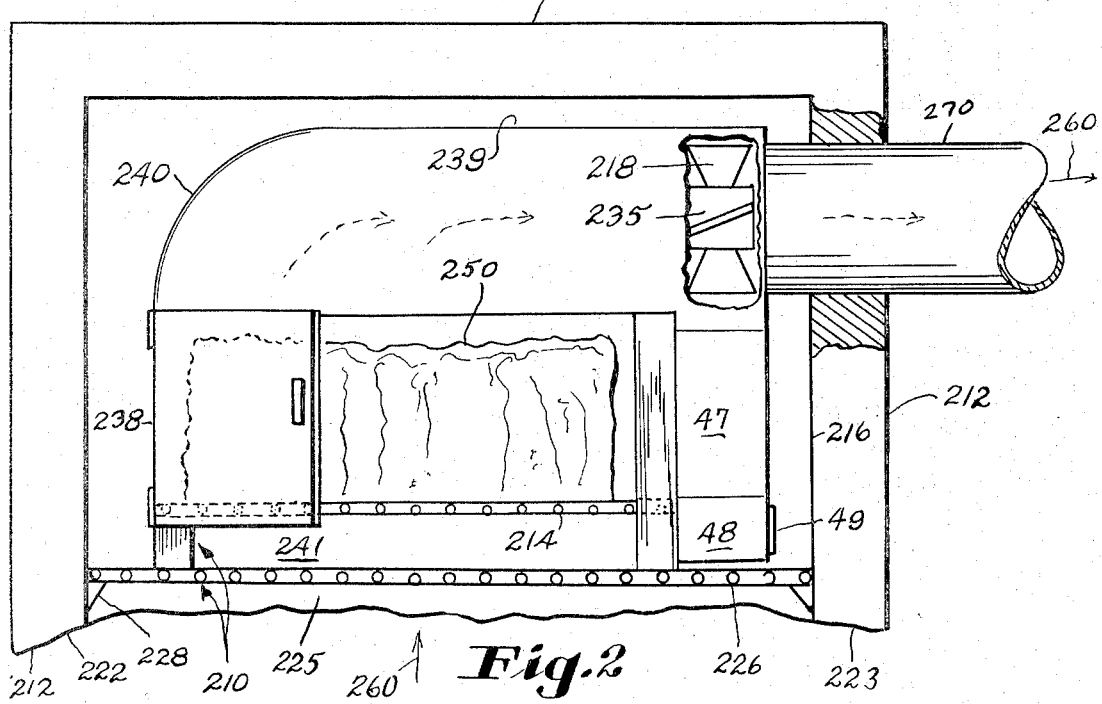
FIG. 2 is a fragmentary front elevational view showing second embodiment.

Turning to the second embodiment of the invention shown in FIG. 2, for the purpose of avoiding needless repetition, certain of the parts corresponding to those of the first embodiment are given the same reference characters with the addition of the prefix "2".

The second embodiment differs from the first embodiment principally in the following respects.

The means 20 is omitted, relying on the relatively lower humidity of the refrigerated air 260. As contrasted with the first embodiment, this process takes more time.

The upper portion of the casing 216 forms a plenum from which the fan, which rotates about a horizontal axis, exhausts the air 260 containing moisture from the meat 250 outside of the means 212 through the duct 270.

In the second embodiment, the fan 235 is energized by a battery 47 which may be reenergized by the charger 48 with power cord (not shown) which is connectible with the receptacle 49.

I wish it to be understood that I do not desire to be limited to the exact details of method and construction shown and described, for obvious modifications will occur to a person skilled in the art to which the present invention relates.

I claim:

1. The method of aging meat comprising the steps of; providing a flow of air having humidity ranging from zero to 50 percent about said meat, maintaining the temperature of said air between just above freezing and 40° Fahrenheit; and exposing said meat to said flow of air for a period of substantially 24 to 72 hours; whereby a relatively dry skin-like layer is formed on the surface of said meat serving to extend loss of moisture from the body of the meat, and preventing the formation of mold on the surface thereof during the aging period.

* * * * *